United States Patent
Bossler et al.

(10) Patent No.: US 8,036,137 B2
(45) Date of Patent: Oct. 11, 2011

(54) METHODS AND APPARATUS FOR SUPPORTING A HALF-DUPLEX MODE OF OPERATION FOR USER EQUIPMENT COMMUNICATIONS IN A RADIO COMMUNICATION SYSTEM

(75) Inventors: Daniel Bruce Bossler, Chandler, AZ (US); Scott Dave Blanchard, Mesa, AZ (US); Curtis Lee Cornils, Chandler, AZ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 226 days.

(21) Appl. No.: 12/323,182

(22) Filed: Nov. 25, 2008

(65) Prior Publication Data

US 2010/0128642 A1    May 27, 2010

(51) Int. Cl.
*H04L 12/26*    (2006.01)
(52) U.S. Cl. .................. 370/252; 370/316; 370/350
(58) Field of Classification Search .................. 370/296
See application file for complete search history.

(56) References Cited

U.S. PATENT DOCUMENTS

| | | | | |
|---|---|---|---|---|
| 4,606,023 | A * | 8/1986 | Dragoo | 398/61 |
| 4,833,671 | A * | 5/1989 | Beckner et al. | 370/429 |
| 6,388,997 | B1 * | 5/2002 | Scott | 370/280 |
| 6,731,946 | B1 * | 5/2004 | Stanwood et al. | 455/517 |
| 7,433,348 | B1 * | 10/2008 | Bordui et al. | 370/350 |
| 2006/0221909 | A1 * | 10/2006 | Farineau et al. | 370/336 |
| 2009/0135748 | A1 * | 5/2009 | Lindoff et al. | 370/296 |
| 2009/0274086 | A1 * | 11/2009 | Petrovic et al. | 370/312 |

* cited by examiner

*Primary Examiner* — Seema S. Rao
*Assistant Examiner* — Wanda Russell
(74) *Attorney, Agent, or Firm* — Ingrassia Fisher & Lorenz, P.C.

(57) ABSTRACT

Embodiments include methods performed in time division duplex (TDD) radio communication systems in which information is communicated between a first node (e.g., a base) and a second node (e.g., user equipment) in a context of a data frame that includes a plurality of slots. The second node applies an adjustment to an alignment between a second node transmit clock and a second node receive clock based on a propagation delay between the first node and the second node. The adjusted alignment ensures that second node receive slots and second node transmit slots are non-overlapping with each other in time, and that the second node will operate in a half-duplex mode of operation. The second node transmits a transmit burst during the second node transmit slots, and receives a first node transmit burst from the first node during the second node receive slots.

19 Claims, 7 Drawing Sheets

METHODS AND APPARATUS FOR SUPPORTING A HALF-DUPLEX MODE OF OPERATION FOR USER EQUIPMENT COMMUNICATIONS IN A RADIO COMMUNICATION SYSTEM

GOVERNMENT LICENSE RIGHTS

The U.S. Government may have certain rights to some or all of the inventive subject matter of the present application as provided for by the terms of contract No. N00039-04-C-2009 awarded by the Department of Defense (Navy).

TECHNICAL FIELD

The inventive subject matter generally relates to methods and apparatus for supporting a half-duplex mode of operation for user equipment (UE) communications in a radio communication system, and more particularly for supporting a half-duplex mode of operation for UE communications in a satellite communication system.

BACKGROUND

In some radio communication systems, radio frequency (RF) signals are communicated between a plurality of radios and a base. Some systems are configured to support communications with "half-duplex radios" (i.e., radios that are adapted to operate in a half-duplex mode). Such systems also may be configured to support communications with "full-duplex radios" (i.e., radios that are adapted to operate in a full-duplex mode). A radio operating in half-duplex mode may either receive RF signals or transmit RF signals, but not both simultaneously. In contrast, a radio operating in full-duplex mode may transmit and receive RF signals simultaneously using different frequencies. Although full-duplex radios have certain advantages over half-duplex radios, full-duplex radios are not without disadvantages. For example, full-duplex radios tend to have significantly greater hardware complexity than half-duplex radios. Therefore, full-duplex radios generally are more expensive than half-duplex radios. In addition, because full-duplex radios transmit and receive information using different frequencies, full-duplex radios tend to consume more available system bandwidth than half-duplex radios.

Half-duplex radios may be used in a time division duplex (TDD) system, which is a communication system in which time division multiplexing is used to separate transmit and receive RF signals. A half-duplex radio adapted for use within a TDD system may include a relatively simple switch between the radio's transmit and receive subsystems. The switch is operable to cause the radio either to receive RF signals from a base or to transmit RF signals to the base, but not both simultaneously. A half-duplex radio and a base in a TDD system use a single frequency for transmitting and receiving. Therefore, communications between the half-duplex radio and the base may consume less available bandwidth than a full-duplex system. Using TDD, the base transmits while the radio is receiving, and vice versa. During any given time interval, only the base or the half-duplex radio may be transmitting, while the other device is receiving. However, when propagation delays between the radio and the base become too long (e.g., when the length of a communication frame is relatively short compared with the propagation delay), a half-duplex radio is incapable of maintaining this switching synchronicity with the base. Accordingly, communications with half-duplex radios is not generally supported in TDD communication systems in which long propagation delays are inherent.

Because of the advantages of half-duplex radios, however, methods and apparatus are desired to support communications with half-duplex radios in TDD communication systems having inherently long propagation delays. Accordingly, what are needed are methods and apparatus for providing half-duplex communications in a radio communication system, and more particularly in a TDD radio communication system, and even more particularly in a TDD radio communication system in which long propagation delays may exist between a radio and a base. Other features and characteristics of the inventive subject matter will become apparent from the subsequent detailed description and the appended claims, taken in conjunction with the accompanying drawings and this background.

BRIEF DESCRIPTION OF THE DRAWINGS

The inventive subject matter will hereinafter be described in conjunction with the following drawing figures, wherein like numerals denote like elements.

DETAILED DESCRIPTION

Embodiments include methods and apparatus for supporting a half-duplex mode of operation for user equipment (UE) communications in a radio communication system, and more particularly in a time division duplex (TDD) radio communication system, and even more particularly in a TDD radio communication system in which long propagation delays may exist between a radio and a base (e.g., a satellite communication system). The following detailed description of the inventive subject matter is merely exemplary in nature and is not intended to limit the inventive subject matter or the application and uses of the inventive subject matter. Furthermore, there is no intention to be bound by any theory presented in the following detailed description.

Figure 1:
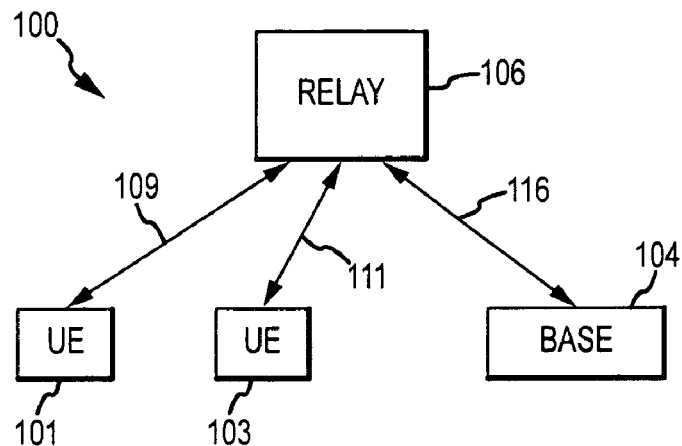
FIG. 1 is a simplified diagram of a radio communication system, in accordance with an example embodiment.

FIG. 1 is a simplified diagram of a radio communication system 100, in accordance with an example embodiment.

System 100 includes a plurality of wireless communication devices 101, 103 (referred to below as user equipment or "UE") and at least one network transceiver, referred to herein as a "base" 104. UE 101, 103 and/or base 104 alternatively may be referred to below as a "node," which generically refers to a communication device adapted to transmit and receive radio signals over an air interface. UE 101, 103 may include any one or more devices adapted to transmit, over wireless communication links 109, 111, radio signals that are intermediately or finally destined for base 104, and to receive over the wireless communication links 109, 111, radio signals originating from or routed by base 104 toward the UE 101, 103. Each UE 101, 103 may be a mobile, portable or stationary device, which may include, but are not limited to, a device selected from a group of devices that includes a cellular telephone, a radio, a pager, a personal data assistant, a computer (e.g., a laptop or desktop computer), a network transceiver, an unmanned autonomous vehicle, and/or a wireless transceiver. Base 104 includes a mobile, portable or stationary device adapted to transmit radio signals over a wireless communication link 116, which information may include information destined for any one or more of UE 101, 103. Base 104 also is adapted to receive radio signals over the wireless communication link 116, which information may include information originating from any one or more of UE 101, 103.

A system (e.g., system 100) in which embodiments may be implemented include, but are not limited to, currently existing or future wireless communication systems that supports a TDD mode, a wideband code division multiple access (W-CDMA) system, a UMTS-TDD (Universal Mobile Telecommunications System-Time Division Duplex) system that supports a TD-CDMA (Time Division CDMA) air interface, a TD-SCDMA (Time Division Synchronous CDMA) system, a wireless local area network (WLAN), a WiMAX (Worldwide Interoperability for Microwave Access) system (e.g., an IEEE 802.16 WiMAX system), a Universal Serial Bus (USB), and/or a half-duplex packet mode network based on carrier sense multiple access (e.g., 2-wire or hubbed Ethernet). System 100 may communicate based on proprietary, existing, and/or emerging standards or protocols, such as, for example but not by way of limitation, an IEEE (Institute of Electrical and Electronics Engineers) 802.16 standard (WiMAX, MIMO-WiMAX (Multiple-Input, Multiple-Output WiMAX)), an IEEE 802.11a, g, and/or n standard (WLAN, MIMO-WLAN), an ETSI (European Telecommunications Standards Institute) BRAN HiperLAN 2 standard, a DVB standard, a DVB-T (DVB Terrestrial) standard, a DAB standard, a WLAN standard, WNW (Wideband Networking Waveform) standard, a MIMO-OFDM standard, and/or other standards or proprietary protocols.

In an embodiment, UE 101, 103 and base 104 are adapted to communicate indirectly with each other through one or more relay apparatus 106. Essentially, relay apparatus 106 is adapted to function as a "bent pipe" for radio signals communicated between UE 101, 103 and base 104. The term "relay apparatus" is used for example purposes only, and the term is not meant to limit relay apparatus 106 to a particular type of electronic device. In an embodiment, relay apparatus 106 may include at least one satellite-borne or terrestrial-based transmitter-receiver, transceiver, transponder, or repeater. In a more particular embodiment, relay apparatus 106 includes a transponder borne by a geostationary satellite (i.e., a satellite following a geostationary orbit). The transponder is adapted to receive radio signals from UE 101, 103 over links 109, 111, to filter, amplify, and otherwise process the signals in the analog and/or digital domain, and to produce a radio signal, which relay apparatus 106 transmits over link 116 to base 104. In the particular embodiment just described, relay apparatus 106 is further adapted to receive a radio signal over link 116 from base 104, to filter, parse, route, amplify, and otherwise process the signal in the analog and/or digital domain, thus producing radio signals that relay apparatus 106 transmits over links 109, 111 to UE 101, 103. In other embodiments, relay apparatus 106 may be borne by a satellite other than a geostationary satellite, such as a satellite following a low-Earth orbit, a medium-Earth orbit, a Molniya orbit, or another type of geosynchronous orbit, for example. In addition, although only one relay apparatus 106 is illustrated in FIG. 1, it is to be understood that, in other embodiments, information may be communicated between UE 101, 103 and base 104 through a relay apparatus network that includes one or more satellite-borne and/or terrestrial based relay apparatus adapted to communicate with each other and with UE 101, 103 and base 104. In still another embodiment, UE 101, 103 and base 104 may be adapted to communicate directly with each other without any intervening relay apparatus.

As will be described in more detail later, UE 101, 103 are adapted to communicate using a half-duplex mode of communication, in which a UE (e.g., UE 101) may transmit radio signals during certain time periods, and may receive radio signals during other, non-overlapping time periods. Switching between transmitting signals and receiving signals may be implemented by UE 101, 103 using a relatively simple switching apparatus (e.g., transmit/receive switch 705, FIG. 7), according to an embodiment. When UE 101, 103 includes such relatively simple switching apparatus for performing half-duplex communications and excludes apparatus associated with performing full-duplex communications, the cost, size, weight, and/or complexity of UE 101, 103 may be significantly less than UE adapted to provide full-duplex communications. It is to be understood, however, that UE 101, 103 also may be adapted to communicate using a full-duplex mode of communication. However, such communication is not discussed in detail herein, as various embodiments pertain more particularly to a UE 101, 103 adapted to communicate using a half-duplex mode of communication.

As will also be discussed in more detail later, base 104 is adapted to communicate using a full-duplex mode of communication, in which base 104 may transmit radio signals and receive radio signals during time periods that may partially or completely overlap each other. Accordingly, base 104 may communicate with UE 101, 103 adapted for half-duplex communications, full-duplex communications, or both. Simultaneous transmission and reception of radio signals may be implemented by base 104 using a diplexer (e.g., diplexer 805, FIG. 8) or other similarly-functioning apparatus, in an embodiment.

In an embodiment, information communicated between a UE 101, 103 and a base 104 is packetized into fixed-length or variable-length data frames prior to transmission. The "frame duration" refers to the length of time that it takes to transmit a data frame. A frame duration is a function of the quantity of information to be transmitted within a frame, the modulation technique being used, and the transmission frequency, among other things. A "frame time" refers to a window of time during which a device (e.g., a UE) transmits and receives data signals corresponding to one frame.

The base-to-user communication path (e.g., the path from base 104 to UE 101) and the user-to-base communication path (e.g., the path from UE 101 to base 104) may be substantially synchronized. In an embodiment, each UE 101, 103 is responsible for transmitting ("TX") a data-bearing radio signal or data burst ("UE TX burst") at a proper transmit start time within a frame time so that the UE TX burst arrives at the base 104 when the base 104 expects it to arrive. However, radio signals communicated between UE 101, 103 and base 104 are affected by the signal propagation time (or "propagation delay"), which is a function of the radio wave propagation velocity through the air interface, the physical distance between the UE 101, 103 and the base 104 (e.g., through relay apparatus 106), and other system-added processing delays. When distances/propagation delays between UE 101, 103 and base 104 are relatively short (e.g., the frame duration is long compared with the propagation delay), a UE (e.g., UE 101) and base 104 may share the time allocated for a particular data frame (the "frame time"). According to a first example embodiment, base 104 may transmit during a first half of a frame time and may receive during a second half of the frame time, while UE 101 receives during the first half of the frame time and transmits during the second half of the frame time. Alternatively, according to a second example embodiment, the UE 101 may transmit during a first half of a frame time and may receive during a second half of the frame time, while base 104 receives during the first half of the frame time and transmits during the second half of the frame time. Although the below description uses the first example, it is to be understood that embodiments of the inventive subject matter include the second example, as well.

According to various embodiments, which will be described in detail below, synchronized communication may be achieved between a UE (e.g., UE 101, FIG. 1) operating in a half-duplex mode and a base (e.g., base 104, FIG. 1) operating in a full duplex mode. Briefly, a communication frame is subdivided into a plurality of slots (e.g., 15 slots). Prior to initiating data communication between the UE and the base, the UE determines a time offset that the UE will use to transmit a UE TX burst, and communicates information indicating this time offset to the base. Using the time offset information, the UE and the base may determine within which slots of the communication frame the UE or the base should transmit or receive information to ensure that the UE may operate robustly in half-duplex mode, and to further ensure that the base will receive the UE TX burst when expected. Prior to description of an embodiment of a method for synchronizing communication between a UE and a base, an example of a data frame format will be briefly discussed in conjunction with FIG. 2.

Figure 2:
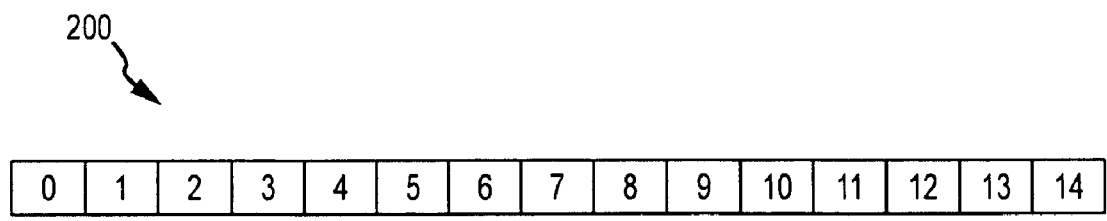
FIG. 2 is a simplified diagram of a data frame, in accordance with an example embodiment.

FIG. 2 is a simplified diagram of a data frame 200, in accordance with an example embodiment. Data frame 200 has a duration, and includes a plurality of slots, labeled 0-14 in FIG. 2, where each slot corresponds to a time slice within the duration of the data frame 200. In a particular embodiment, a duration of data frame 200 is within a range of about 5 milliseconds (ms) to about 15 ms, with a duration of about 10 ms being preferred at about 2100 megahertz (MHz), although a frame duration may be longer or shorter and/or the frequency/frequency band may be higher or lower than the above-given example range and values. In addition, in a particular embodiment, a data frame 200 includes a number of slots in a range of between about 10 to about 20 slots, with a preferred number of slots being about 15 slots, although the number of slots may be more or fewer than the above-given example range or value.

As will be described in more detail later, an embodiment includes a UE (e.g., UE 101, 103) utilizing a first subset of slots for receiving data (referred to as "UE receive slots"), and a second, non-overlapping subset of slots for transmitting data (referred to as "UE transmit slots"). According to an embodiment, the equivalent of one or more slots of the data frame 200 may be designated as a "guard band slot". Designation of one or more slots as guard band slots accommodates time intervals (e.g., "guard band intervals") during which the UE is neither transmitting or receiving, but instead is switching from a transmit mode to a receive mode, or vice versa. In example embodiments described herein, one slot is designated as a guard band slot, although it is to be understood that, in other embodiments, more than one slot may be designated as guard band slots. According to the example embodiment (i.e., that one slot is designated as a guard band slot), the UE may switch from a transmit mode to a receive mode after completing its transmission of a UE transmit burst during a first guard band interval corresponding to a first portion of a slot duration. In addition, the UE may switch from a receive mode to a transmit mode after completing its reception of a base transmit burst during a second guard band interval corresponding to a second portion of the slot duration, where the sum of the first portion and the second portion of the slot duration does not exceed the slot duration. According to such an embodiment, the guard band slot essentially is "split" between the transmit-to-receive switching process and the receive-to-transmit switching process.

As will also be described in more detail later, an embodiment also includes a base (e.g., base 104) utilizing a first subset of slots (not designated in FIG. 2) for transmitting data, and a second subset of slots (not designated in FIG. 2) for receiving data. However, in the case of the base, the first and second subsets of slots may (or may not) overlap each other, as the base is adapted to communicate in a full-duplex mode, according to an embodiment. In an embodiment, the first subset of slots includes a first plurality of consecutive slots, and the second subset of slots includes a second plurality of consecutive slots. In alternate embodiments, either or both the first or second subsets of slots may include non-consecutive slots of a frame.

In a system in which the transmit and receive data rates are symmetrical (i.e., the UE transmit data rate and the base transmit data rates are substantially the same), a subset of half or fewer slots of a data frame may be designated for receiving data, and a second (non-overlapping) subset of a same number of slots may be designated for transmitting data. Accordingly, for example, the total number of slots in a data frame (e.g., data frame 200) may include the number of slots designated for transmitting data (e.g., 7 slots), the number of slots designated for receiving data (e.g., 7 slots), and the number of slots designated as guard band slots (e.g., 1 slot). Alternately, in a system in which the transmit and receive data rates are asymmetrical, the number of slots in the subset of slots designated for receiving data may be different from the number of slots in the subset of slots designated for transmitting data, or vice versa. Although embodiments in which transmit and receive data rates are asymmetrical are not described in detail herein, it is to be understood that such embodiments fall within the scope of the inventive subject matter.

In an embodiment, the data in the receive and transmit slot subsets is uncompressed. In another embodiment (e.g., an embodiment implemented in a CDMA system), the data in either or both the receive or transmit slot subsets may be compressed by applying a smaller spreading factor to the data. In a particular embodiment, UMTS "compressed mode" operation is employed, where the spreading factor that would be used if data transmission were to occur during all slots is reduced by a factor of two (e.g., a spreading factor is used that is about ½ that which would be used in a non-compressed mode to achieve the same data throughput). This may result in the consumption of two Orthogonal Variable Spreading Factor (OVSF) codes compared to operations in a non-compressed mode. However, the OVSF codes may be time shared between two different UEs having the same offset, in an embodiment. Normal UMTS operation specifies that different scrambling codes also be used. Therefore, should the same OVSF be allocated to two UEs in overlapping times, multiple access interference may increase, although the two UEs may still communicate.

According to various embodiments, the locations or pattern of the guard band intervals (i.e., the times when transmit-to-receive and receive-to-transmit switching occurs in the UE) is directly related to the propagation delay between a UE and a base. This is in contrast with traditional systems. In traditional systems, the frame structure provides for the inclusion of guard band intervals for the purpose of providing the UE an opportunity to measure the quality of signals in other frequency channels. As such, the guard band interval pattern in a traditional system is much different from the one required for half-duplex communication. Frame structures in traditional systems are designed for propagation delays that are relatively small compared to the frame time (or even a slot duration), and the determination of the locations or the pattern of guard band intervals does not consider the propagation delay, as is done using embodiments of the inventive subject matter.

The data frame structure illustrated in FIG. 2 is for example purposes only and to facilitate discussion of various embodiments. It is to be understood that different data frame structures may be used while still employing the various embodiments. For example, but not by way of limitation, although only one guard band slot is discussed as being designated within the data frame 200, it is to be understood that more than one guard band slot may be designated. In addition, although FIG. 2 illustrates a data frame 200 that includes fifteen slots, a data frame may include more or fewer slots, in other embodiments. Other modifications to the data frame structure may be implemented, in various alternate embodiments.

Figure 3:
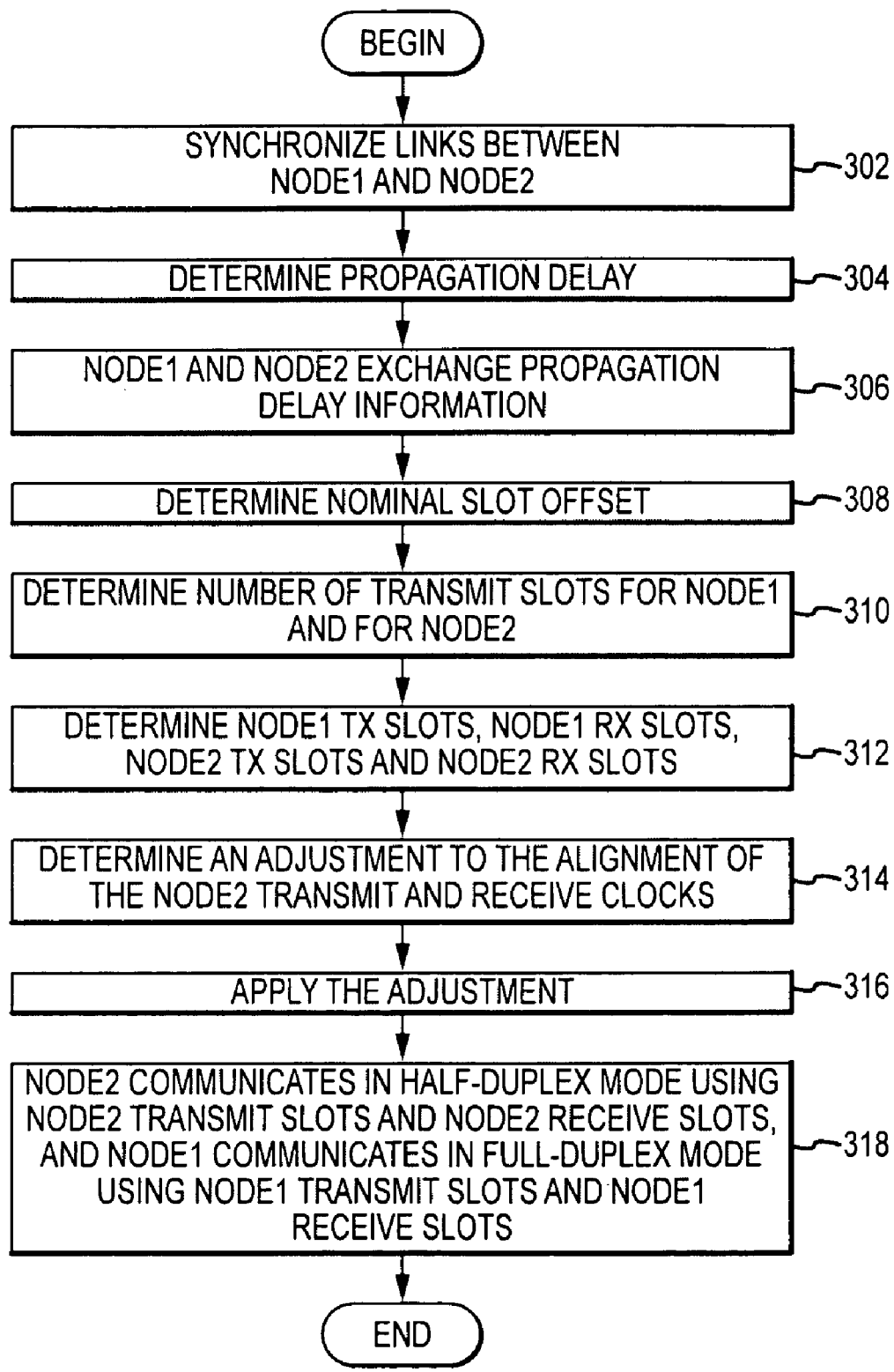
FIG. 3 is a flowchart of a method for establishing synchronized communications between a UE operating in a half-duplex mode and a base operating in a full-duplex mode, in accordance with an example embodiment.

FIG. 3 is a flowchart of a method for establishing synchronized communications between a UE (e.g., UE 101, FIG. 1) operating in a half-duplex mode and a base (e.g., base 104, FIG. 1) operating in a full-duplex mode, in accordance with an example embodiment. The description, below, may refer to Node1 or Node2 rather than referring to a base or a UE. This substitution is made to illustrate that the portions of the methods that pertain to the base and the UE are interchangeable, in various embodiments. According to an embodiment in which the UE communicates using a half duplex mode of operation, Node1 is the base, and Node2 is the UE. However, in other embodiments, Node1 may be the UE and Node2 may be the base. In still other embodiments, both Node1 and Node2 could be UE, or both Node1 and Node2 could be bases. In still other embodiments, either or both Node1 and/or Node2 could be different types of communication apparatus. It is to be understood that any given examples or references to a base or a UE are not meant to limit the embodiments to the examples given.

The method may begin, in block 302, when Node1 and Node2 synchronize the Node1-to-Node2 (e.g., base-to-UE) and Node2-to-Node1 (e.g., UE-to-base) links. In an embodiment, synchronization may be achieved by Node2 utilizing a synchronization channel (e.g., P-SCH and/or S-SCH) to determine the slot and frame timing of a candidate physical channel (e.g., a primary common control physical channel or P-CCPCH), and the primary scrambling code for a common pilot channel (e.g., a CPICH), among other things. The common pilot channel may then be used for timing and phase estimations, which enable Node2 to remain synchronized with Node1. In alternate embodiments, other methods of synchronization between Node1 and Node2 may be performed.

In block 304, the propagation delay for radio signals exchanged between Node1 and Node2 is determined. In an embodiment, determining the propagation delay includes Node2 sending a signal to Node1 at a first time, Node1 receiving the signal at a second time, Node1 sending a message to Node2 that indicates the second time, and Node2 receiving the message at a third time. Node2 may determine the one-way propagation delay as approximately the difference between the first time and the second time. Node2 may determine the two-way propagation delay (also referred to below as "RTT") as approximately twice the one-way propagation delay, in an embodiment. In an alternate embodiment, Node2 may determine the two-way propagation delay as approximately the difference between the first time and the third time.

In block 306, Node2 and Node1 exchange information indicating the one-way or two-way propagation delay. In a particular embodiment, this information is sent by Node2 to Node1. In an alternate embodiment, Node1 may determine the one-way and/or two-way propagation delay using a method analogous to that described above, and Node1 may send the propagation delay information to Node2. The propagation delay information may include a value indicating the actual one-way or two-way propagation delay as calculated by Node1 or Node2 (e.g., a value expressed in milliseconds), according to an embodiment, or the propagation delay information may include other types of information that enables a determination of the one-way or two-way propagation delay (e.g., the first, second, and/or third times discussed in the previous paragraph, an encoded value indicating the propagation delay, a slot offset corresponding to the propagation delay, or some other value).

In block 308, either Node1, Node2 or both use the propagation delay and/or the propagation delay information to determine a nominal slot offset, NSO, which represents a number of slots that Node2 will adjust the alignment between the Node2 transmit clock and the Node2 receive clock by adjusting (e.g., advancing or delaying) the Node2 transmit clock, the Node2 receive clock or both clocks, according to various embodiments. As used herein, a transmit clock is a clock that a device (e.g., Node1 or Node2) uses to determine when (e.g., during which slots) the device will transmit a burst to another device. Similarly, a receive clock is a clock that a device uses to determine when (e.g., during which slots) the device should be prepared to receive a burst from another device. When a device's transmit and receive clocks are aligned in time, the beginning of transmit slot 0 will occur simultaneously with the beginning of receive slot 0, and so on. In contrast, when a device's transmit and receive clocks are not aligned in time, the beginning of transmit slot 0 will not occur simultaneously with the beginning of receive slot 0, and instead may occur simultaneously with the beginning of a receive slot other than receive slot 0.

Node1 and Node2 each maintain a transmit clock and a receive clock, in an embodiment. The transmit clock indicates the beginning and the end of a transmit portion of a frame (e.g., the start time of a first transmit slot and the end time of a last transmit slot), and the receive clock indicates the beginning and the end of a receive portion of a frame (e.g., the start time of a first receive slot and the end time of a last receive slot). According to a first example embodiment, Node2 (e.g., the UE) maintains different transmit and receive clocks (e.g., the UE's transmit and receive clocks potentially are not aligned with each other for certain propagation delays), whereas Node1 (e.g., the base) maintains the same transmit and receive clocks (e.g., the base's transmit and receive clocks are aligned with each other regardless of the propagation delay). According to a second example embodiment, both Node1 and Node2 maintain different transmit and receive clocks. The below description discusses the first example embodiment in detail. For purposes of brevity, the second example embodiment is not discussed in detail herein, although it is to be understood that the inventive subject matter encompasses this embodiment.

According to the first example embodiment (i.e., Node1 transmit and receive clocks are aligned while Node2 transmit and receive clocks are potentially not aligned), the nominal slot offset, NSO, indicates how many slots the Node2 transmit and receive clocks are to be offset from each other. The nominal slot offset may be represented, for example, by an integer number of slots corresponding to a given two-way propagation delay. When the propagation delay information represents the propagation delay in some manner other than a value expressed in time, the two-way propagation delay may be determined from that information, and then the nominal slot offset may be determined from the two-way propagation delay, as is described below. Alternatively, the nominal slot offset may be determined from a one-way propagation delay. According to an embodiment, the nominal slot offset, NSO, may be determined according to Equation 1, below:

$$\text{NSO} = [\text{INT}(\text{RTT}/\text{slotTime})](\text{mod NumSlots}), \quad \text{(Equation 1)}$$

where RTT is the two-way propagation delay, slotTime is the duration of a slot, NumSlots is the number of slots in a frame, and mod represents a modulo operation that is performed to ensure that NSO has a value that is less than the number of slots in the frame. Using the embodiment of FIG. 2 (i.e., 10 ms frame, NumSlots=15 slots), each slot has a slot duration, slotTime, of about 0.667 ms. Assuming, for example, that the two-way propagation delay, RTT, is determined to have a value of 523 ms, the nominal slot offset, NSO, may be determined as NSO=INT(523/0.667) mod 15=4 slots. In alternate embodiments, other formulations may be used to determine the nominal slot offset, or the nominal slot offset may be determined using a lookup table (e.g., a lookup table that correlates propagation delay information with slot offset values). Either Node1, Node2, or both may determine the nominal slot offset. When Node1 determines the nominal slot offset, Node1 may send information representing the nominal slot offset to Node2, or vice versa.

In block 310, a first number ("Node1 TX NumSlots") of the NumSlots slots in a frame are allocated as Node1 TX slots (e.g., slots of a frame during which the base should transmit a base TX burst to the UE), and a second number ("Node2 TX NumSlots") of the NumSlots slots in a frame are allocated as Node2 TX slots (e.g., slots of a frame during which the UE should transmit a UE TX burst to the base). This allocation may be made in accordance with the pre-defined system design. For example, but not by way of limitation, the Node1 TX NumSlots and Node2 TX NumSlots may be determined according to Equations 2, below:

$$\text{Node1 TX NumSlots} = \quad \text{(Equations 2)}$$

$$\text{INT}\left(\frac{\text{Node1 data rate} * (\text{NumSlots} - \text{NumGuardSlots})}{\text{Node1 data rate} + \text{Node2 data rate}}\right)$$

$$\text{Node2 TX NumSlots} =$$

$$\text{INT}\left(\frac{\text{Node2 data rate} * (\text{NumSlots} - \text{NumGuardSlots})}{\text{Node1 data rate} + \text{Node2 data rate}}\right) + \text{NumGuardSlots},$$

where NumGuardSlots is the number of guard band slots designated within the frame.

According to an embodiment, the restriction that Node1 TX NumSlots+Node2 TX NumSlots=NumSlots should hold. As discussed previously in conjunction with FIG. 2, one or more slots may be designated as guard band slots. In the example embodiments discussed herein, one slot is designated as a guard band slot, and the various equations and calculations discussed herein reflect such an example embodiment. It is to be understood that the various equations and calculations may be modified when more than one slot is designated as a guard band slot, and such modifications are intended to be included within the scope of the inventive subject matter. In addition, it is to be understood that whichever node (either Node1 or Node2) is communicating in a half-duplex mode is the node that utilizes the time allocated for a guard band slot in order to perform the switching operations between a transmit mode and a receive mode, and vice versa. In the example embodiments described herein, Node2 is the node that communicates in the half-duplex mode over a range of propagation delays, and accordingly Node 2 is the node that utilizes the time allocated for the guard band slot.

As also discussed previously, the amount of time that corresponds to a guard band slot (i.e., a slot duration) may be split to accommodate a first guard band interval before Node2 transmits a Node2 transmit burst during which Node2 performs a receive-to-transmit switching process, and a second guard band interval after Node2 transmits the Node2 transmit burst during which Node2 performs a transmit-to-receive switching process. Accordingly, the guard band slot essentially is "split" between the transmit-to-receive switching process and the receive-to-transmit switching process. In the example equations and calculations discussed below, the guard band slot is considered to be included within the Node2 transmit slots, and accordingly the value for the Node2TXNumSlots includes the actual slots during which Node2 may transmit a Node2 transmit burst and the guard band slot. During an actual transmission, a first guard band interval is designated before transmission of the Node2 transmit burst, and a second guard band interval is designated after transmission of the Node2 transmit burst, where the cumulative time of the first guard band interval and the second guard band interval does not exceed a slot duration. It is to be understood that inclusion of the guard band slot within the Node2 transmit slots is for convenience purposes only, and that the guard band slot alternatively could be included within the Node2 receive slots. The equations and calculations included herein could be modified to accommodate such an alternate embodiment, and accordingly such an alternate embodiment is intended to be included within the scope of the inventive subject matter.

Referring again to Equations 2, above, for an example embodiment in which NumSlots=15, NumGuardSlots=1, Node1 is the base and Node2 is the UE, and the Node1 data rate and the Node2 data rate are equal in both directions, Node1 TX NumSlots equals 7 and Node2 TX NumSlots equals 8, where one of the Node2 transmit slots is designated as a guard band slot to accommodate a first guard band interval before transmission of a Node2 transmit burst and a second guard band interval after transmission of the Node2 transmit burst.

In block 312, Node1, Node2 or both use the number of slots in the frame, the nominal slot offset, the number of transmit slots allocated to Node1, the number of transmit slots allocated to Node2, and the number of guard band slots to determine which slot numbers correspond to the Node1 TX slots, the Node1 receive (RX) slots, the Node2 TX slots, and the Node2 RX slots. According to a first embodiment, referred to as a "contiguous frame method," a transmit burst is contained wholly within a single frame. According to a second embodiment, referred to as a "split frame method," a transmit burst may span a boundary from one frame to another. The calculations performed in block 312 using the contiguous frame method will be described first, and then the calculations performed in block 312 using the split frame method will be described.

Using the contiguous frame method, the Node1 TX slots may be determined from the nominal slot offset, NSO, the number of transmit slots allocated to Node1 (Node1 TX NumSlots), and the number of transmit slots allocated to Node2 (Node2 TX NumSlots). In the contiguous set of slots designated as Node1 TX slots, a first slot is referred to as FirstNode1 TX Slot, and a last slot is referred to as LastNode1 TX Slot. The FirstNode1 TX slot and the LastNode1 TX Slot may be determined according to Equations 3, below:

IF NSO<Node1 *TX* NumSlots+1, then

FirstNode1 *TX* Slot=(Node2 *TX* NumSlots−NSO)mod NumSlots;

LastNode1 *TX* Slot=(FirstNode1 *TX* Slot+Node1 *TX* NumSlots−1)mod NumSlots;

ELSE(NSO>=Node1 *TX* NumSlots+1)

FirstNode1 TX Slot=0;

LastNode1 *TX* Slot=(FirstNode1 *TX* Slot+Node1 *TX* NumSlots−1)mod NumSlots

END IF (Equations 3)

Continuing the example above in which NumSlots=15, NSO=4 slots, Node1 TX NumSlots equals 7, and Node2 TX NumSlots equals 8, FirstNode1 TX Slot=4 and LastNode1 TX Slot=10. Accordingly, the Node1 TX slots include slots 4-10.

Still using the contiguous frame method, the Node1 RX slots may be determined from the NSO, Node1 TX NumSlots, and Node2 TX NumSlots. In the contiguous set of slots designated as Node1 RX slots, a first slot is referred to as FirstNode1 RX Slot, and a last slot is referred to as LastNode1 RX Slot. The FirstNode1 RX slot and the LastNode1 RX Slot may be determined according to Equations 4, below:

IF NSO<Node1 *TX* NumSlots+1, then

FirstNode1 RX Slot=0;

LastNode1 *RX* Slot=(FirstNode1 *RX* Slot+Node2 *TX* NumSlots−1)mod NumSlots;

ELSE (NSO>=Node1 *TX* NumSlots+1)

FirstNode1 *RX* Slot=(NSO+Node1 *TX* NumSlots)mod NumSlots;

LastNode1 *RX* Slot=(FirstNode1 *RX* Slot+Node2 *TX* NumSlots−1)mod NumSlots

END IF (Equations 4)

Continuing the example above, FirstNode1 RX Slot=0 and LastNode1 RX Slot=7. Accordingly, the Node1 RX slots include slots 0-7. As discussed previously, and as will be explained in more detail below, although the number of Node1 RX slots is eight slots in the example, in actuality Node1 should be receiving a Node2 transmit burst during only seven of the eight slots, because Node2 will implement a first guard band interval before transmitting the Node2 transmit burst and a second guard band interval after transmitting the Node2 transmit burst.

Still using the contiguous frame method, the Node2 TX slots may be determined from NSO, Node1 TX NumSlots, and Node2 TX NumSlots. In the contiguous set of slots designated as Node2 TX slots, a first slot is referred to as FirstNode2 TX Slot, and a last slot is referred to as LastNode2 TX Slot. The FirstNode2 TX slot and the LastNode2 TX Slot may be determined according to Equations 5, below:

IF NSO<Node1 *TX* NumSlots+1, then

FirstNode2 TX Slot=0;

LastNode2 *TX* Slot=(FirstNode2 *TX* Slot+Node2 *TX* NumSlots−1)mod NumSlots;

ELSE(NSO>=Node1 *TX* NumSlots+1)

FirstNode2 *TX* Slot=(NSO+NumSlots)mod NumSlots;

LastNode2 *TX* Slot=(FirstNode2 *TX* Slot+Node2 *TX* NumSlots−1)mod NumSlots

END IF (Equations 5)

Continuing the example above, FirstNode2 TX Slot=0 and LastNode2 TX Slot=7. Accordingly, the Node2 TX slots include slots 0-7. As discussed previously, although the number of Node2 TX slots is eight slots in the example, in actuality Node2 should be transmitting a Node2 transmit burst during only seven of the eight slots, because Node2 will implement a first guard band interval before transmitting the Node2 transmit burst and a second guard band interval after transmitting the Node2 transmit burst.

Still using the contiguous frame method, the Node2 RX slots may be determined from the NSO, Node1 TX NumSlots, and Node2 TX NumSlots. In the contiguous set of slots designated as Node2 RX slots, a first slot is referred to as FirstNode2 RX Slot, and a last slot is referred to as LastNode2 RX Slot. The FirstNode2 RX slot and the LastNode2 RX Slot may be determined according to Equations 6, below:

IF NSO<Node1 *TX* NumSlots+1, then

FirstNode2 *RX* Slot=(Node2 *TX* NumSlots−NSO)mod NumSlots;

LastNode2 *RX* Slot=(FirstNode2 *RX* Slot+Node1 *TX* NumSlots−1)mod NumSlots;

ELSE(NSO>=Node1 *TX* NumSlots+1)

FirstNode2 RX Slot=0;

LastNode2 *RX* Slot=(FirstNode2 *RX* Slot+Node1 *TX* NumSlots−1)mod NumSlots

END IF (Equations 6)

Continuing the example above, FirstNode2 RX Slot=4 and LastNode2 RX Slot=10. Accordingly, the Node2 RX slots include slots 4-10.

Equations 3-6 pertain to determining Node1 and Node2 TX and RX slots using the contiguous frame method, according to an embodiment. Equations 7-10, below, pertain to determining Node1 and Node2 TX and RX slots using the split frame method, according to an alternate embodiment.

Using the split frame method, the Node1 TX slots may be determined from Node1 TX NumSlots. The FirstNode1 TX slot and the LastNode1 TX Slot may be determined according to Equations 7, below:

FirstNode1 TX Slot=0;

LastNode1 *TX* Slot=FirstNode1 *TX* Slot+Node1 *TX* NumSlots−1. (Equations 7)

Continuing the example above, FirstNode1 TX Slot=0 and LastNode1 TX Slot=6. Accordingly, the Node1 TX slots include slots 0-6.

Still using the split frame method, the Node1 RX slots may be determined from the NSO, Node1 TX NumSlots, and Node2 TX NumSlots. The FirstNode1 RX slot and the LastNode1 RX Slot may be determined according to Equations 8, below:

FirstNode1 *RX* Slot=(NSO+Node1 *TX* NumSlots)mod NumSlots;

LastNode1 *RX* Slot=(FirstNode1 *RX* Slot+Node2 *TX* NumSlots−1)mod NumSlots. (Equations 8)

Continuing the example above, FirstNode1 RX Slot=11 and LastNode1 RX Slot=3. Accordingly, the Node1 RX slots include slots 11-14 of a first frame and slots 0-3 of a next frame.

Still using the split frame method, the Node2 TX slots may be determined from Node1 TX NumSlots. The FirstNode2 TX slot and the LastNode2 TX Slot may be determined according to Equations 9, below:

FirstNode2 *TX* Slot=(NSO+Node1 *TX* NumSlots)mod NumSlots;

LastNode2 *TX* Slot=(FirstNode2 *TX* Slot+Node2 *TX* NumSlots−1)mod NumSlots. (Equations 9)

Continuing the example above, FirstNode2 TX Slot=11 and LastNode2 TX Slot=3. Accordingly, the Node2 TX slots include slots 11-14 of a first frame and slots 0-3 of a next frame.

Still using the split frame method, the Node2 RX slots may be determined from the Node1 TX NumSlots. The FirstNode2 RX slot and the LastNode2 RX Slot may be determined according to Equations 10, below:

FirstNode2 RX Slot=0;

LastNode2 *RX* Slot=(FirstNode2 *RX* Slot+Node1 *TX* NumSlots−1)mod NumSlots. (Equations 10)

Continuing the example above, FirstNode2 RX Slot=0 and LastNode2 RX Slot=6. Accordingly, the Node2 RX slots include slots 0-6.

Referring again to FIG. 3, in block 314, a determination is made of an adjustment to the alignment between the Node2 transmit and receive clocks. According to an embodiment, the adjustment represents a number of slots to offset the Node2 transmit frame boundary with respect to the Node2 receive frame boundary in order to ensure that Node2 communicates using a half-duplex mode of operation. According to an embodiment, the Node2 transmit frame boundary corresponds to a start time for slot 0 of the Node2 transmit clock, and the Node2 receive frame boundary corresponds to a start time for slot 0 of the Node2 receive clock. Accordingly, the number of slots to offset the Node2 transmit frame boundary with respect to the Node2 receive frame boundary (i.e., a start time for slot 0 of the Node2 receive clock) corresponds to a number of slots that the Node2 transmit frame boundary will occur before reception of data corresponding to the Node1 transmit frame boundary. According to an embodiment, the adjustment involves advancing the Node2 transmit clock in time and delaying the Node2 receive clock in time by a total time that corresponds to the nominal slot offset. According to a further embodiment, the adjustment is performed symmetrically about the Node1 transmit/receive frame boundary. In other words, the Node2 transmit clock is advanced by substantially the same amount of time that the Node2 receive clock is delayed, with respect to the Node1 transmit/receive frame boundary. In an alternate embodiment in which Node2 receives during the first portion of a frame and transmits during a second portion of a frame, the adjustment may involve advancing the Node2 receive clock and/or delaying the Node2 transmit clock. Either way, the number of slots to offset the Node2 transmit frame boundary with respect to the Node2 receive frame boundary, Node2 Frame Adjustment, may be determined according to Equation 11, below:

Node2 Frame Adjustment=NSO. (Equation 11)

Continuing the example above, Node2 Frame Adjustment=4 slots.

In block 316, Node 2 applies the adjustment to the alignment of the Node2 transmit and receive clocks. According to an embodiment, the Node2 transmit clock is advanced by a period of time, Node2 TX Clock Adjustment Time, corresponding to one half of the Node2 Frame Adjustment, and the Node2 receive clock is delayed by a period of time, Node2 RX Clock Adjustment Time corresponding to one half of the Node2 Frame Adjustment. The periods of time to adjust the Node2 frame clocks may be determined according to Equations 12, below:

Node2 *TX* Clock Adjustment Time=½(Node2 Frame Adjustment*slotTime);

Node2 *RX* Clock Adjustment Time=½(Node2 Frame Adjustment*slotTime). (Equations 12)

Continuing the example above, in which a slot duration, slotTime, is about 0.667 ms, the period of time corresponding to Node2 TX Clock Adjustment Time and Node2 RX Clock Adjustment Time is about 1.334 ms, which is approximately or exactly the time that the Node2 transmit clock may be advanced and that the Node2 receive clock may be delayed. In various alternate embodiments, applying the adjustment may include adjusting (e.g., advancing) only the Node2 transmit clock or adjusting (e.g., delaying) only the Node2 receive clock by twice the Node2 Adjustment time. In such alternate embodiments, Node1 may adjust (e.g., delay or advance) both the Node1 TX clock and the Node1 RX clock so that the adjustment applied by Node2 still results in the Node2 TX clock and the Node2 RX clock being offset from each other symmetrically about the Node1 transmit/receive frame boundary.

In block 318, Node1 communicates in a full-duplex mode consistent with the determined Node1 TX slots and Node1 RX slots, and Node2 communicates in half-duplex mode consistent with the adjusted Node2 transmit and/or receive clocks and the determined Node2 TX slots and Node2 RX slots. More specifically, Node1 transmits during the Node1 TX slots and is prepared to receive during the Node1 RX slots, and Node2 transmits during the Node2 TX slots and is prepared to receive during the Node2 RX slots. It is to be understood that, according to the example given above, Node2 may perform a receive-to-transmit switching operation prior to transmitting a Node2 transmit burst (e.g., during a first portion of the first Node2 TX slot), and Node2 may perform a transmit-to-receive switching operation after transmitting the Node2 transmit burst (e.g., during a last portion of the last Node2 TX slot). Accordingly, guard band intervals are implemented both before and after transmission of the Node2 transmit burst.

As discussed previously in conjunction with FIG. 1, the UE (e.g., Node2) may transmit a UE TX burst destined for the base (e.g., Node1) to a relay apparatus network that is adapted to relay the UE TX burst to the base, and the base may transmit the base TX burst destined for a UE to the relay apparatus network, which is further adapted to relay the base TX burst to the UE. During the communication session, Node1 and/or Node2 also may adjust their transmit and/or receive timing as the propagation delay between Node1 and Node2 varies. The method may then end.

Figure 4:
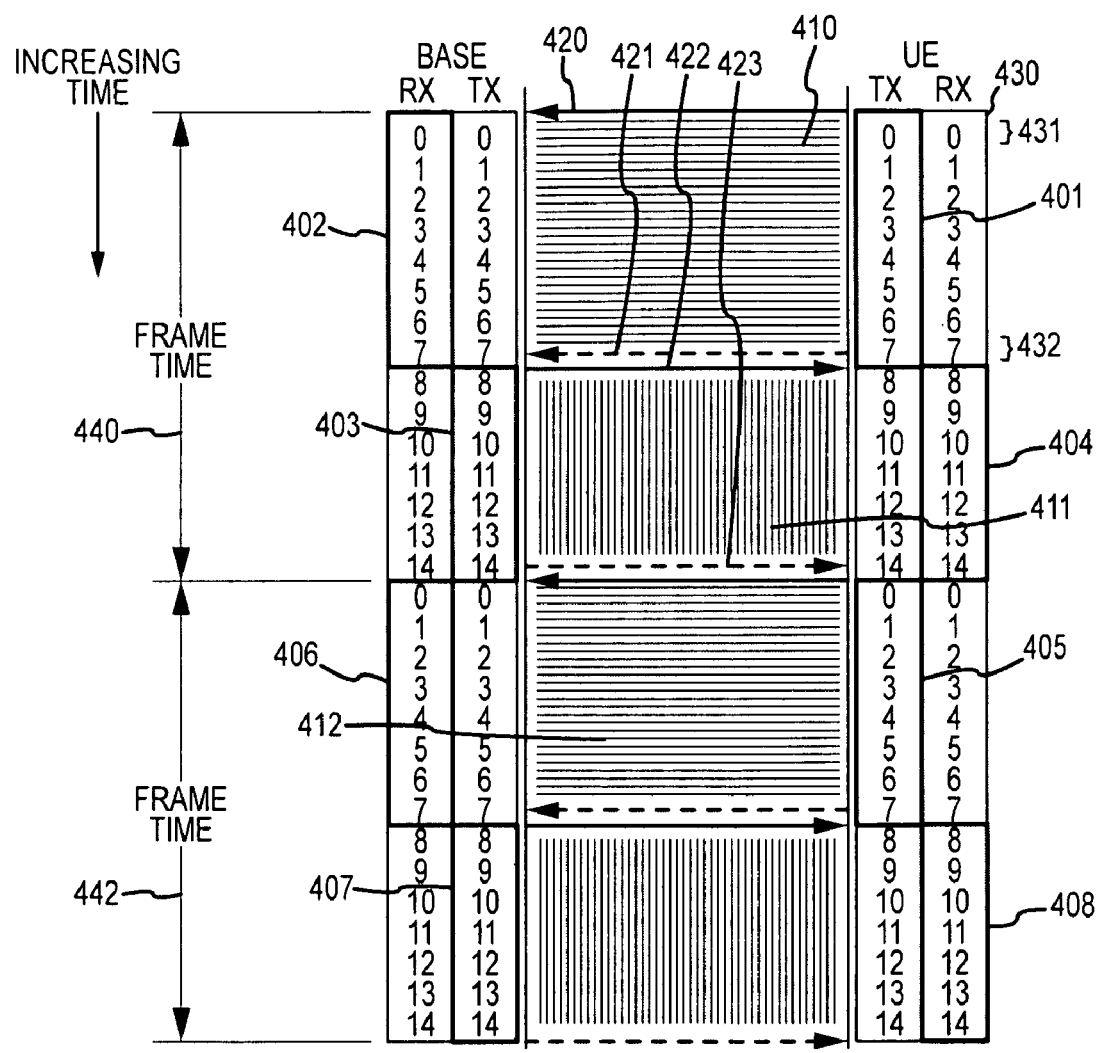
FIG. 4 is a diagram illustrating transmissions between a base and a user equipment (UE) in a relatively low propagation delay environment, in accordance with an example embodiment.
Figure 5:
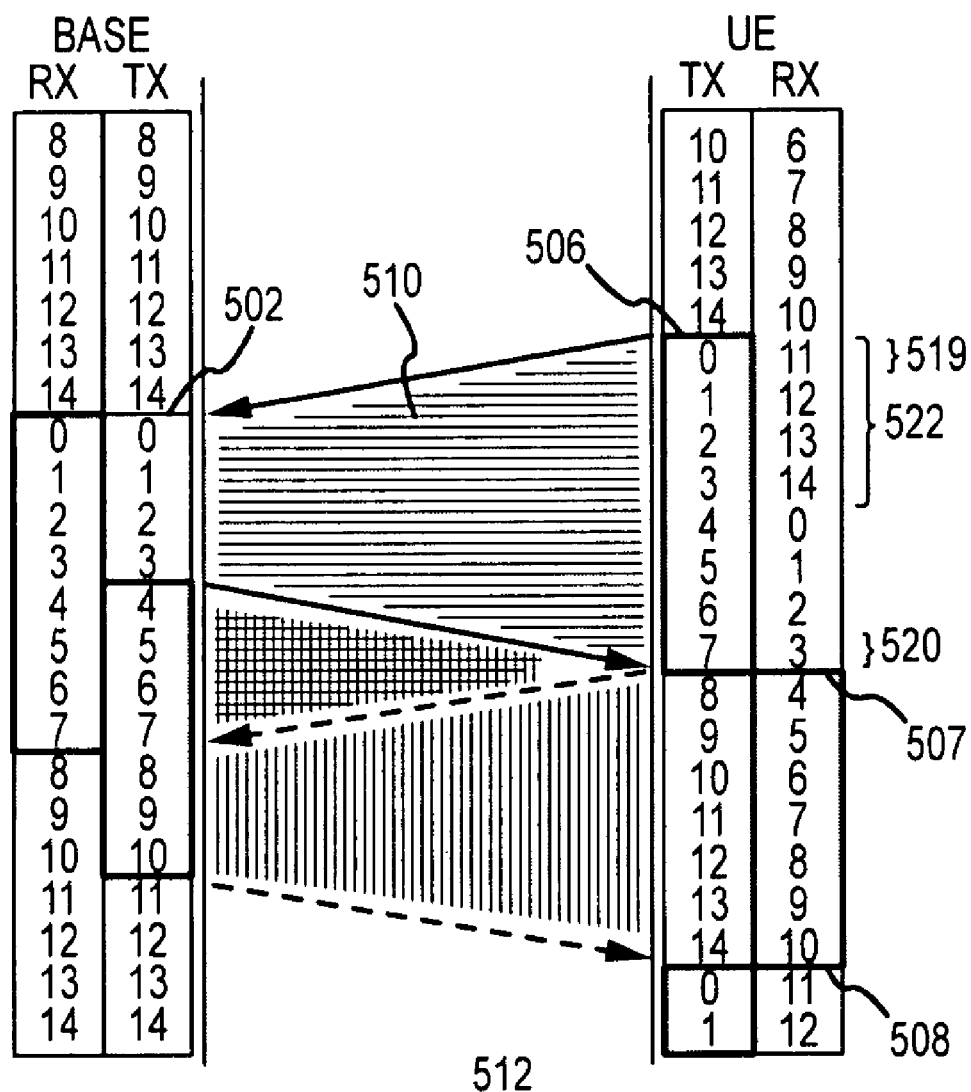
FIG. 5 is a diagram illustrating transmissions between a base and a UE in a relatively long propagation delay environment, where base and UE transmit and receive slots are determined using a contiguous frame method, according to an embodiment.
Figure 6:
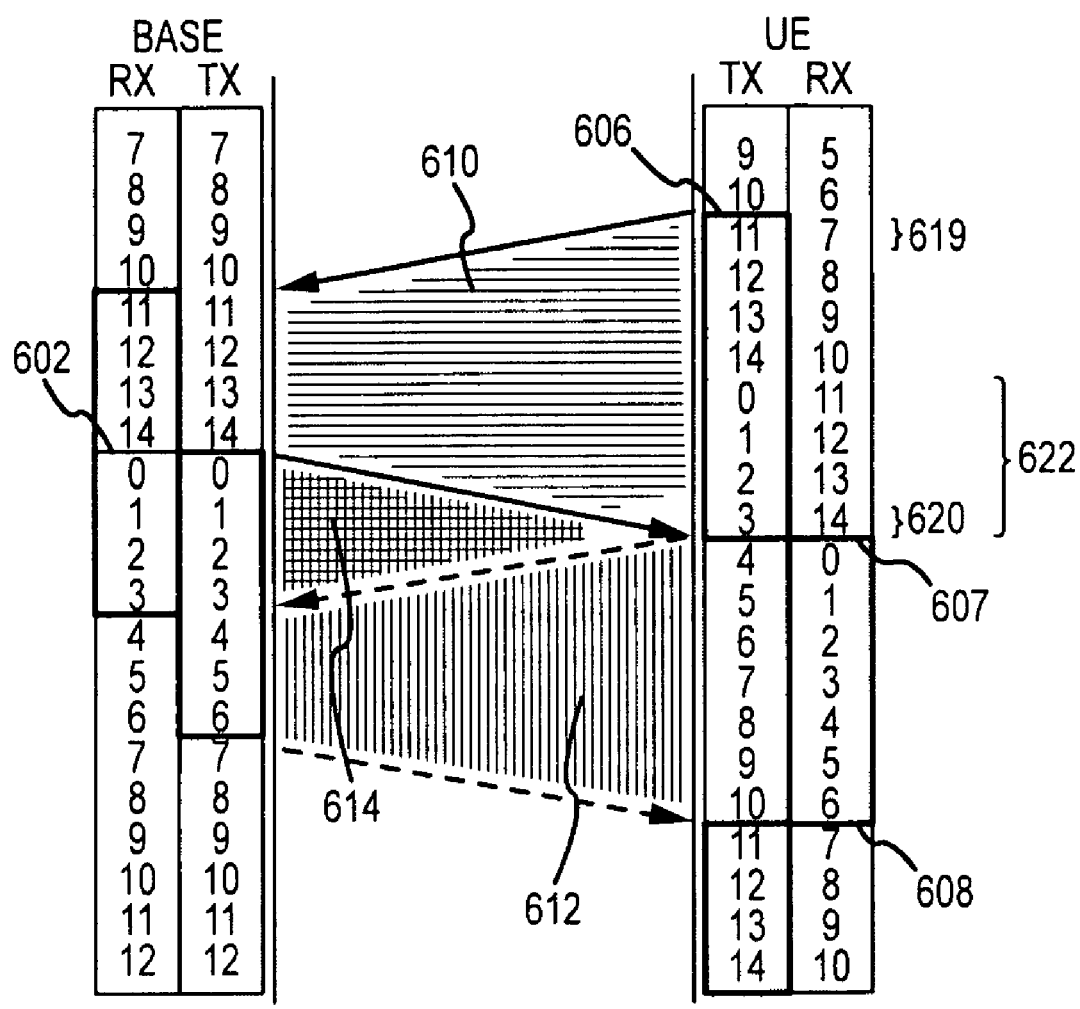
FIG. 6 is a diagram illustrating transmissions between a base and a UE in a relatively long propagation delay environment, where base and UE transmit and receive slots are determined using a split frame method, according to an embodiment.

FIGS. 4-6 are provided to further illustrate various embodiments. More particularly, FIG. 4 is a diagram illustrating transmissions between a base (e.g., base 104, FIG. 1) and a UE (e.g., UE 101, 103, FIG. 1) during two consecutive frame times 440, 442 in a relatively low propagation delay environment (e.g., an environment in which the nominal slot offset corresponds to zero slots), according to an embodiment. In the illustrated example, NumSlots=15 slots, NumGuardSlots=1 slot, and NSO=0 slots. In the diagram, time is assumed to increase in a downward direction from the top of the diagram toward the bottom. Base receive and transmit slots, respectively, are represented in the two columns on the left side of the diagram, and UE transmit and receive slots, respectively, are represented in the two columns on the right side of the diagram.

Boxes 401, 402, 403, 404, 405, 406, 407, 408 encompass slots during which either the base or the UE transmits or receives a burst. A UE TX burst 410 present on the air interface is indicated by an area of horizontal hatch lines between a solid arrow 420 and a lower dashed arrow 421 extending from the UE side to the base side. For example, box 401 indicates that the UE is transmitting a UE TX burst 410 during UE transmit slots 0-7. Guard band intervals 431, 432 may be implemented before and after transmission of the UE TX burst 410, as illustrated. Box 402 indicates that the base is receiving the UE TX burst 410 during base receive slots 0-7. Similarly, a base TX burst 411 present on the air interface is indicated by an area of vertical hatch lines between a solid arrow 422 and a lower dashed arrow 423 extending from the base side to the UE side. For example, box 403 indicates that the base is transmitting a base TX burst 411 during base transmit slots 8-14, whereas box 404 indicates that the UE is receiving the base TX burst 411 during UE receive slots 8-14.

As mentioned previously, according to an example embodiment, the UE may transmit a UE TX burst during approximately a first half of a frame time (e.g., during slots 0-7) and may receive a base TX burst during approximately a second half of the frame time (e.g., during slots 8-14), while the base may receive the UE TX burst during approximately the first half of the frame time and transmit the base TX burst during approximately the second half of the frame time. Such an embodiment is depicted in FIG. 4. Prior to a start time 430, and in preparation for transmitting a UE TX burst 410, a UE may enable its transmitter and disable its receiver (e.g., during guard band interval 431). During approximately a first half of the first frame time 440 (e.g., during UE transmit slots 401 and base receive slots 402), the UE may transmit UE TX burst 410 to the base, and the base may receive the UE TX burst 410. After transmitting the UE TX burst 410, the UE may then disable its transmitter and enable its receiver (e.g., during guard band interval 432) so that, during approximately a second half of the first frame time 440 (e.g., during base transmit slots 403 and UE receive slots 404), the base may transmit a base TX burst 411 to the UE, and the UE may receive the base TX burst 411. After receiving a base TX burst 411, and in preparation for transmitting a second UE TX burst 412 to the base, the UE may then disable its receiver and enable its transmitter (e.g., during another guard band interval, not indicated in FIG. 4).

FIG. 4 represents communications in an environment having a propagation delay that corresponds to a nominal slot offset of zero slots. As the propagation delay between a UE and a base increases relative to the frame duration, the nominal slot offset eventually assumes a non-zero value. According to an embodiment, the UE may adjust the UE transmit clock and the UE receive clock relative to each other (e.g., they may be adjusted to a non-aligned state), so that the UE may continue to operate in a half-duplex mode. In addition, the base may adjust the base transmit clock relative to the base receive clock for certain nominal slot offsets. In other words, in an embodiment, the transmit and receive clocks may be adjusted, and/or the base transmit slots, the base receive slots, the UE transmit slots, and/or the UE receive slots may be determined to ensure that the UE may operate in half-duplex mode, regardless of the nominal slot offset. As the propagation delay and the nominal slot offset increase from a nominal slot offset of zero (or a modulo thereof), the UE both transmits a UE TX burst and receives a base TX burst earlier in the data frame than it would for a nominal slot offset of zero slots (i.e., the UE transmit clock and/or receive clock are adjusted in time). As discussed previously, the base may operate in full-duplex mode, although it also may operate in half-duplex mode for relatively short propagation delays (i.e., propagation delays corresponding to a nominal slot offset of 0 slots). In order to further clarify concepts of the various embodiments for both the contiguous frame and the split frame methods of determining base and UE transmit and receive slots, FIGS. 5 and 6 are provided. FIGS. 5 and 6 are diagrams illustrating communications between a base and a UE in an environment in which the propagation delay corresponds to a non-zero nominal slot offset.

FIG. 5 is a diagram illustrating transmissions between a base and a UE in a relatively long propagation delay environment, where base and UE transmit and receive slots are determined using a contiguous frame method, according to an embodiment. Using the example given above in conjunction with Equations 1-6, 11, and 12 (i.e., NumSlots=15 slots, NumGuardSlots=1 slot, slotTime=0.667 ms, RTT=523 ms, and NSO=4 slots), the Node1 TX slots, Node1 RX slots, Node2 TX slots, and Node2 RX slots are determined as follows:

Node1 TX slots include slots 4-10 (from Equation 3),
Node1 RX slots include slots 0-7 (from Equation 4),
Node2 TX slots include slots 0-7 (from Equation 5),
Node2 RX slots include slots 4-10 (from Equation 6), and the Node2 Frame Advance is 4 slots. As FIG. 5 illustrates, with the base being Node1 and the UE being Node2, the base transmit clock and the base receive clock are aligned in time with each other. This time-alignment is indicated by line 502, which indicates the base transmit/receive frame boundary, and which occurs at the beginning of base transmit slot 0 and base receive slot 0. As also indicated in FIG. 5, the UE transmit clock has been advanced in time and the UE receive clock has been delayed in time by the Node2 TX Clock Adjustment Time and the Node2 RX Clock Adjustment Time (from Equations 12), respectively, resulting in a spread (e.g., spread 522) between the alignment of the Node2 transmit and receive clocks corresponding to the Node2 Frame Advance of 4 slots. Accordingly, the UE transmit and receive clocks are not aligned in time with each other. As discussed previously, the adjustments to the UE transmit and receive clocks may be made symmetrically about the base transmit/receive frame boundary (e.g., line 502).

Guard band intervals 519, 520 may be implemented before and after transmission of a UE TX burst 510, as illustrated. Beginning at a start time 506, the UE may disable its receiver and enable its transmitter in preparation for transmitting the first UE TX burst 510 (e.g., during guard band interval 519). During approximately half of the first frame time (e.g., when the data rates for the UE and the base are approximately the same), the UE transmits the first UE TX burst 510 (e.g., during slots 0-7, as indicated in the "UE TX" column). Prior to a second time 507 that approximately corresponds to a time when the UE will begin receiving a base TX burst 512, the UE may disable its transmitter and enable its receiver in preparation for receiving the base TX burst 512 (e.g., during guard band interval 520). The UE then may begin to receive the base TX burst 512 at the second time 507. The UE continues to receive the base TX burst (e.g., during slots 4-10, as indicated in the "UE RX" column) until a third time 509, and the process repeats thereafter.

In FIG. 5, area 514 with cross-hatching (e.g., combined vertical and horizontal hatch lines) indicates a base TX burst and a UE TX burst being simultaneously present on the air interface. The vertical boundary of area 514 that intersects the base side of the air interface corresponds with a time interval during which the base simultaneously is transmitting a base TX burst and receiving a UE TX burst. Accordingly, during that time interval, the base is operating in a full-duplex mode of operation. As can be observed from FIG. 5, there is no time interval during which the UE simultaneously is transmitting a UE TX burst and receiving a base TX burst. According to an embodiment, this is true for all propagation delays between the UE and the base. Accordingly, regardless of the propagation delay, the UE may operate in a half-duplex mode of operation, according to various embodiments.

FIG. 6 is a diagram illustrating transmissions between a base and a UE in a relatively long propagation delay environment, where base and UE transmit and receive slots are determined using a split frame method, according to an embodiment. Using the example given above in conjunction with Equations 1, 2, and 7-12 (i.e., NumSlots=15 slots, NumGuardSlots=1, slotTime=0.667 ms, RTT=523 ms, and NSO=4 slots), the Node1 TX slots, Node1 RX slots, Node2 TX slots, and Node2 RX slots are determined as follows:

Node1 TX slots include slots 0-6 (from Equation 7),
FirstNode1 RX Slot=11 and LastNode1 RX Slot=3. Accordingly, the Node1 RX slots include slot 11 of a first frame and slots 0-3 of a next frame (from Equation 8),
FirstNode2 TX Slot=11 and LastNode2 TX Slot=3. Accordingly, the Node2 TX slots include slot 11 of a first frame and slots 0-3 of a next frame (from Equation 9),
Node2 RX slots include slots 0-6 (from Equation 10),
and the Node2 Frame Advance is 4 slots. As FIG. 6 illustrates, with the base being Node1 and the UE being Node2, the base transmit clock and the base receive clock are aligned in time with each other. This time-alignment is indicated by line 602, which indicates the base transmit/receive frame boundary, and which occurs at the beginning of base transmit slot 0 and base receive slot 0. As also indicated in FIG. 6, the UE transmit clock has been advanced in time and the UE receive clock has been delayed in time by the Node2 TX Clock Adjustment Time and the Node2 RX Clock Adjustment Time (from Equations 12), respectively, resulting in a spread (e.g., spread 622) between the alignment of the Node2 transmit and receive clocks corresponding to the Node2 Frame Advance of 4 slots. Accordingly, the UE transmit and receive clocks are not aligned in time with each other. As discussed previously, the adjustments to the UE transmit and receive clocks may be made symmetrically about the base transmit/receive frame boundary (e.g., line 602).

Guard band intervals 619, 620 may be implemented before and after transmission of a UE TX burst 610, as illustrated. Beginning at a start time 606, the UE may disable its receiver and enable its transmitter in preparation for transmitting the first UE TX burst 610 (e.g., during guard band interval 619). During approximately half of a frame time (e.g., when the data rates for the UE and the base are approximately the same), the UE transmits the first UE TX burst 610 (e.g., during slots 11-14 of a first frame and slots 0-3 of a second frame, as indicated in the "UE TX" column). Prior to a second time 607 that approximately corresponds to a time when the UE will begin receiving a base TX burst 612, the UE may disable its transmitter and enable its receiver in preparation for receiving the base TX burst 612 (e.g., during guard band interval 620). The UE then may begin to receive the base TX burst 612 at the second time 607. The UE continues to receive the base TX burst (e.g., during slots 0-6, as indicated in the "UE RX" column) until a third time 609, and the process repeats thereafter.

In FIG. 6, area 614 with cross-hatching indicates a base TX burst and a UE TX burst being simultaneously present on the air interface. Similar with the example of FIG. 5, the vertical boundary of area 614 that intersects the base side of the air interface corresponds with a time interval during which the base simultaneously is transmitting a base TX burst and receiving a UE TX burst. Accordingly, during that time interval, the base is operating in a full-duplex mode of operation. As can be observed from FIG. 6, there is no time interval during which the UE simultaneously is transmitting a UE TX burst and receiving a base TX burst. Once again, according to an embodiment, this is true for all propagation delays between the UE and the base. Accordingly, regardless of the propagation delay, the UE may operate in a half-duplex mode of operation.

Figure 7:
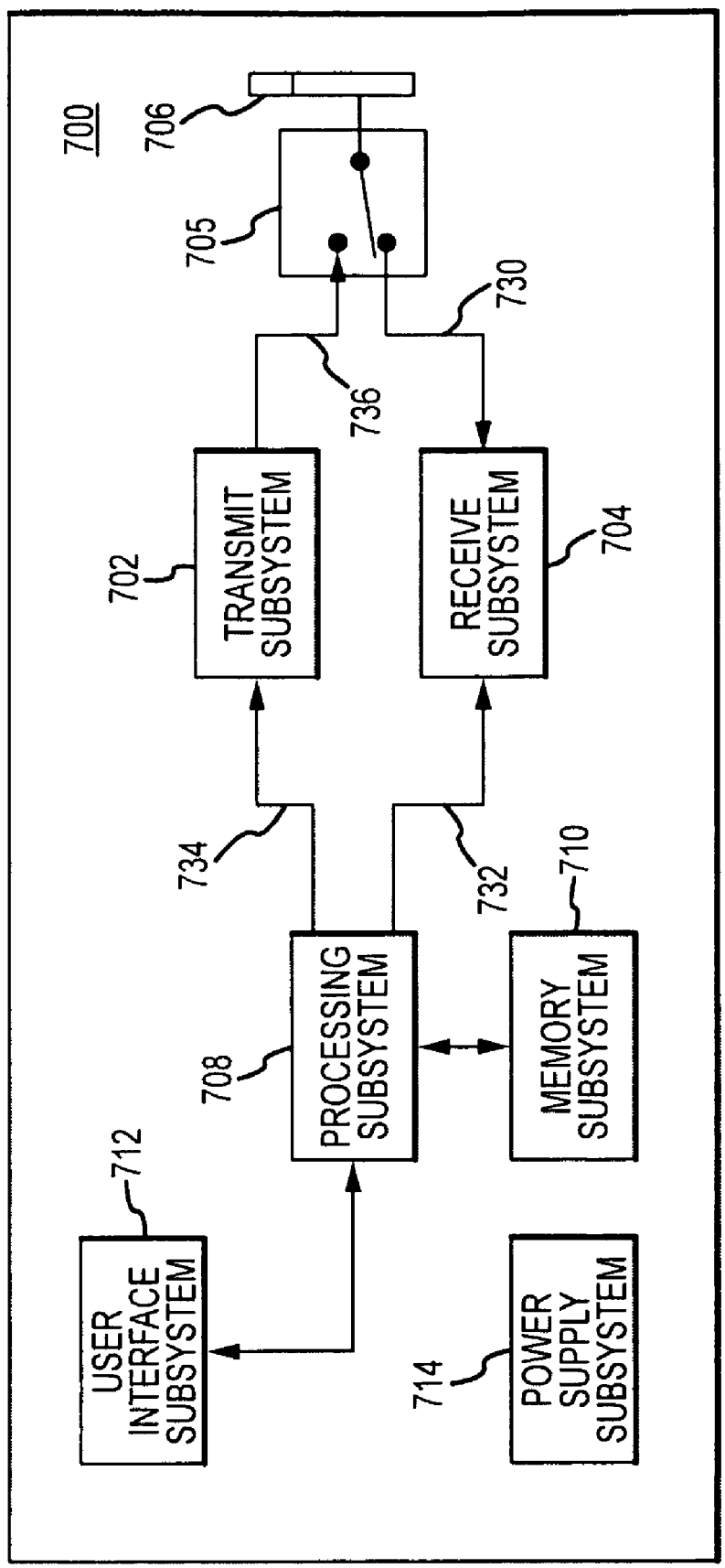
FIG. 7 is a simplified block diagram of a UE, in accordance with an example embodiment.

FIG. 7 is a simplified block diagram of a UE 700 (or a "Node2"), in accordance with an example embodiment. UE 700 is adapted to transmit electromagnetic signals over an air interface. UE 700 includes at least one transmit subsystem 702, receive subsystem 704, transmit/receive switch 705, antenna 706, processing subsystem 708, memory subsystem 710, user interface subsystem 712, and power supply subsystem 714, in an embodiment. These subsystems are communicatively coupled together as illustrated in FIG. 7, where the term "communicatively coupled" means that information signals are transmissible through various interconnections between the subsystems. The interconnections between the subsystems may be direct interconnections that include conductive transmission media, or may be indirect interconnections that include one or more intermediate electrical components. Although certain interconnections are illustrated in FIG. 7, it is to be understood that more, fewer or different interconnections may be present in other embodiments.

The at least one processing subsystem 708 is adapted to perform various functions, which include performing at least some of the steps described in conjunction with FIG. 3. In addition, in an embodiment, the at least one processing subsystem 708 controls the operation of transmit/receive switch 705 according to embodiments discussed herein, in order to selectively activate either the transmit subsystem 702 (e.g., to transmit a UE TX burst) or the receive subsystem 704 (e.g., to receive a base TX burst) using a half-duplex mode of operation. In another embodiment, UE 700 also may include a diplexer to enable UE 700 also to operate in a full-duplex mode. However, such an embodiment is not discussed in detail herein. Additional functions performed by the at least one processing subsystem 708 may include, for example, generating outgoing digital signals 734, processing incoming digital signals 732, interfacing with the at least one memory subsystem 710 to store and retrieve data, interfacing with the at least one user interface subsystem 712, and performing various power control functions in conjunction with the at least one power supply system 714. The at least one power supply system 714 may include, for example, an interface to AC line power and/or a battery power subsystem.

User interface subsystem 712 may include one or more user interface components adapted to enable a user to input commands or other information into UE 700 and/or to provide visual, auditory, or mechanical indicia intended to convey information to the user. For example, but not by way of limitation, user interface subsystem 710 may include one or more display screens, touch screens, lights, speakers, vibration devices, keypads, buttons, dials, and/or other components adapted to receive input commands and/or to produce information-conveying indicia.

Memory subsystem 710 may include one or more components adapted to store digital information in a retrievable format. For example, but not by way of limitation, memory subsystem 710 may include one or more removable or non-removable, volatile or non-volatile memory components, such as ROM-based memory components, RAM-based memory components, CDs, DVDs, and/or magnetic storage media (e.g., hard disks or floppy disks), to name a few.

Transmit subsystem 702 is adapted to receive outgoing digital signals 734 generated by processing subsystem 708, and to perform digital-to-analog conversion, up-conversion, and amplification, among other things, to the outgoing digital signals 734 in order to generate outgoing RF signals 736. The outgoing RF signals 736 are transmitted over the air interface by antenna 706. Receive subsystem 704 is adapted to receive incoming RF signals 730 from antenna 706, and to perform down-conversion, filtering, and analog-to-digital conversion, among other things, to the incoming RF signals 730 in order to generate incoming digital signals 732. The incoming digital signals 732 may be processed by processing subsystem 708.

Figure 8:
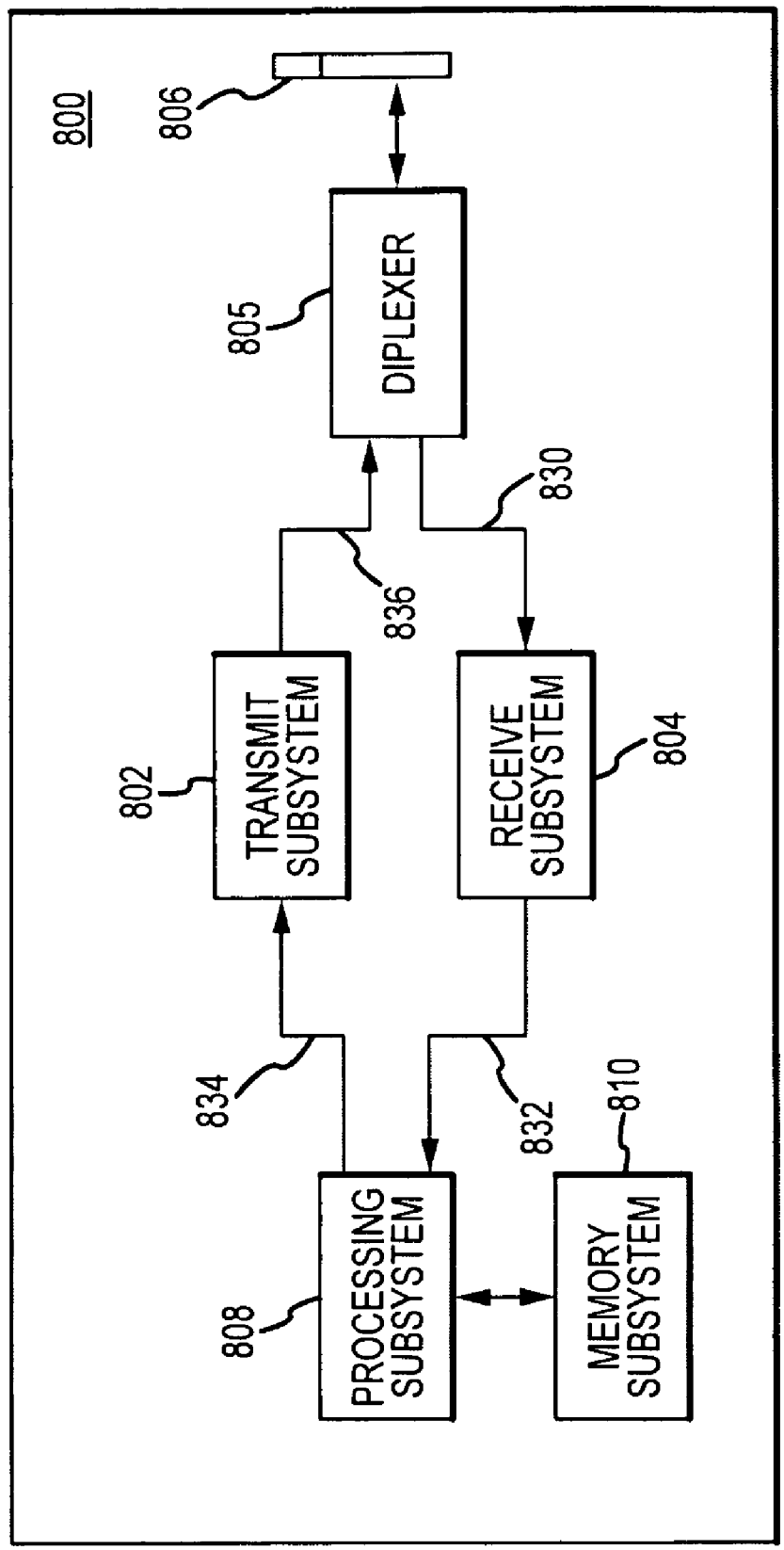
FIG. 8 is a simplified block diagram of a base, in accordance with an example embodiment.

FIG. 8 is a simplified block diagram of a base 800 (or a "Node1"), in accordance with an example embodiment. Base 800 is adapted to transmit electromagnetic signals over an air interface, in order to communicate with a plurality of UE (e.g., UE 101, 103, FIG. 1 or UE 700, FIG. 7). Base 800 includes at least one transmit subsystem 802, receive subsystem 804, diplexer 805, antenna 806, processing subsystem 808, and memory subsystem 810, in an embodiment. These subsystems are communicatively coupled together as illustrated in FIG. 8. Although certain interconnections are illustrated in FIG. 8, it is to be understood that more, fewer or different interconnections may be present in other embodiments.

The at least one processing subsystem 808 is adapted to perform various functions, which include performing at least some of the steps described in conjunction with FIG. 3. In addition, in an embodiment, the at least one processing subsystem 808 controls the operation of diplexer 805 according to embodiments discussed herein, in order to selectively activate either the transmit subsystem 802 (e.g., to transmit a base TX burst) or the receive subsystem 804 (e.g., to receive a UE TX burst) using a full-duplex mode of operation. Additional functions performed by the at least one processing subsystem 808 may include, for example, generating outgoing digital signals 834, processing incoming digital signals 832, interfacing with the at least one memory subsystem 810 to store and retrieve data, and/or interfacing with other wired and/or wireless networks.

Memory subsystem 810 may include one or more components adapted to store digital information in a retrievable format. For example, but not by way of limitation, memory subsystem 810 may include one or more removable or non-removable, volatile or non-volatile memory components, such as ROM-based memory components, RAM-based memory components, CDs, DVDs, and/or magnetic storage media (e.g., hard disks or floppy disks), to name a few.

Transmit subsystem 802 is adapted to receive outgoing digital signals 834 generated by processing subsystem 808, and to perform digital-to-analog conversion, up-conversion, and amplification, among other things, to the outgoing digital signals 834 in order to generate outgoing RF signals 836. The outgoing RF signals 836 are transmitted over the air interface by antenna 806. Receive subsystem 804 is adapted to receive incoming RF signals 830 from antenna 806, and to perform down-conversion, filtering, and analog-to-digital conversion, among other things, to the incoming RF signals 830 in order to generate incoming digital signals 832. The incoming digital signals 832 may be processed by processing subsystem 808.

Embodiments of methods and apparatus for supporting a half-duplex mode of operation for UE in a wireless communication system have now been described. The foregoing detailed description is merely exemplary in nature and is not intended to limit the inventive subject matter or the application and uses of the inventive subject matter to the described embodiments. Furthermore, there is no intention to be bound by any theory presented in the preceding background or detailed description.

Those of skill in the art will recognize, based on the description herein, that various other apparatus and processes may be included in embodiments of the systems and methods described herein for conditioning, filtering, amplifying, and/or otherwise processing the various signals. In addition, the sequence of the text in any of the claims does not imply that process steps must be performed in a temporal or logical order according to such sequence unless it is specifically defined by the language of the claim. The process steps may be interchanged in any order, and/or may be performed in parallel, without departing from the scope of the inventive subject matter. In addition, it is to be understood that information within the various different messages, which are described above as being exchanged between the system elements, may be combined together into single messages, and/or the information within a particular message may be separated into multiple messages. Further, messages may be sent by system elements in sequences that are different from the sequences described above. Furthermore, words such as "connected" or "coupled to" used in describing a relationship between different elements do not imply that a direct physical connection must be made between these elements. For example, two elements may be connected to each other physically, electronically, logically, or in any other manner, through one or more additional elements, without departing from the scope of the inventive subject matter.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled technicians may implement the described functionality in varying ways for each particular application, but such implementation decisions should not be interpreted as causing a departure from the scope of the inventive subject matter.

The various illustrative logical blocks and modules described in connection with the embodiments disclosed herein may be implemented or performed with various types of computational apparatus, including but not limited to, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternate, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in one or more software modules executed by a processor, or in a combination of the two. A software module may reside in random access memory, flash memory, read only memory (ROM), erasable programmable ROM (EPROM), electrical EPROM, registers, hard disk, a removable disk, a compact disc ROM (CD-ROM), or any other form of storage medium known in the art. An exemplary storage medium is coupled to the processor such that the processor can read information from, and write information to, the storage medium. In the alternate, the storage medium may be integral to the processor. The processor and the storage medium may reside in an ASIC. The ASIC may reside in a user terminal. In the alternate, the processor and the storage medium may reside as discrete components in a user terminal.

An embodiment includes a method performed in a time division duplex (TDD) radio communication system in which information is communicated between a first node and a second node in a context of a data frame that includes a plurality of slots, where each slot corresponds to a time slice within a duration of the data frame. The method comprises applying, by the second node, an adjustment to an alignment between a second node transmit clock and a second node receive clock, where the adjustment is based on a propagation delay between the first node and the second node, and where the alignment between the second node transmit clock and the second node receive clock ensures that second node receive slots of the data frame and second node transmit slots of the data frame are non-overlapping with each other in time, and that the second node will operate in a half-duplex mode of operation. The method also comprises transmitting, by the second node, a second node transmit burst during the second node transmit slots, and receiving, by the second node, a first node transmit burst from the first node during the second node receive slots.

Another embodiment includes a method performed in a TDD radio communication system that includes the base and a user equipment (UE). The method comprises applying, by the UE, an adjustment to an alignment between a UE transmit clock and a UE receive clock, where the adjustment is based on a propagation delay between the base and the UE, and where the alignment between the UE transmit clock and the UE receive clock ensures that UE receive slots of the data frame and UE transmit slots of the data frame are non-overlapping with each other in time, and that the UE will operate in a half-duplex mode of operation. The method also comprises transmitting, by the UE, a UE transmit burst during the UE transmit slots, receiving, by the base, the UE transmit burst during base receive slots, transmitting, by the base, a base transmit burst during first node transmit slots, where the first node transmit slots and the first node receive slots overlap each other and the first node operates in a full-duplex mode of operation for some propagation delays between the first node and the second node, and receiving, by the UE, the base transmit burst during the UE receive slots.

Yet another embodiment includes a TDD radio communication system in which information is communicated between a base and a UE in a context of a data frame that includes a plurality of slots, where the base is adapted to operate in a full-duplex mode, and where each slot corresponds to a time slice within a duration of the data frame. The system comprises the UE, which is adapted to operate in a half-duplex mode of operation by receiving a base transmit burst during UE receive slots and transmitting a UE transmit burst during UE transmit slots, where the UE receive slots include a first subset of a plurality of slots of the data frame, where the UE transmit slots include a second subset of the plurality of slots of the data frame, and where the UE receive slots and the UE transmit slots are non-overlapping with each other for all propagation delays between the UE and the base so that the UE operates in the half-duplex mode of operation for all of the propagation delays.

While various exemplary embodiments have been presented in the foregoing detailed description, it should be appreciated that a vast number of variations exist. It should also be appreciated that the exemplary embodiments are only examples, and are not intended to limit the scope, applicability or configuration of the inventive subject matter in any way. Rather, the foregoing detailed description will provide those skilled in the art with a convenient road map for implementing various embodiments of the inventive subject matter, it being understood that various changes may be made in the function and arrangement of elements described in an exemplary embodiment without departing from the scope of the inventive subject matter as set forth in the appended claims and their legal equivalents.

What is claimed is:

1. A method performed in a time division duplex (TDD) radio communication system in which information is communicated between a first node and a second node in a context of a data frame that includes a plurality of slots, wherein each slot corresponds to a time slice within a duration of the data frame, and the method comprises the steps of:
applying, by the second node, an adjustment to an alignment between a second node transmit clock and a second node receive clock, wherein the adjustment is a time interval that corresponds with an integer number of slots, wherein the integer number of slots is a number up to a total number of slots in the data frame, the total number of slots in the data frame includes a fixed number of multiple transmit slots and a fixed number of multiple receive slots, each of the transmit slots and the receive slots has a slot duration, the integer number of slots is mathematically determined based on dividing a propagation delay for radio signals exchanged between the first node and the second node by the slot duration, and wherein the alignment between the second node transmit clock and the second node receive clock ensures that second node receive slots of the data frame and second node transmit slots of the data frame are non-overlapping with each other in time, and that the second node will operate in a half-duplex mode of operation;

transmitting, by the second node, a second node transmit burst during the second node transmit slots; and receiving, by the second node, a first node transmit burst from the first node during the second node receive slots.

2. The method of claim 1, further comprising:
determining the propagation delay;
determining a nominal slot offset, based on the propagation delay, wherein the nominal slot offset represents the integer number of slots; and
determining the adjustment as the time interval that corresponds to the nominal slot offset.

3. A method performed in a time division duplex (TDD) radio communication system in which information is communicated between a first node and a second node in a context of a data frame that includes a plurality of slots, wherein each slot corresponds to a time slice within a duration of the data frame, and the method comprises the steps of:

determining a propagation delay for radio signals exchanged between the first node and the second node;
determining a nominal slot offset, based on the propagation delay, wherein the nominal slot offset represents a number of slots, and the nominal slot offset is determined according to nominal slot offset=[INT(propagation delay/slotTime)](mod NumSlots), where slotTime is a duration of a slot, and NumSlots is a number of slots in the data frame;
determining an adjustment to an alignment between a second node transmit clock and a second node receive clock as a time interval that corresponds to the nominal slot offset, wherein the adjustment, accordingly, is based on the propagation delay between the first node and the second node;
applying, by the second node, the adjustment to the alignment between the second node transmit clock and the second node receive clock, wherein the alignment between the second node transmit clock and the second node receive clock ensures that second node receive slots of the data frame and second node transmit slots of the data frame are non-overlapping with each other in time, and that the second node will operate in a half-duplex mode of operation;
transmitting, by the second node, a second node transmit burst during the second node transmit slots; and
receiving, by the second node, a first node transmit burst from the first node during the second node receive slots.

4. The method of claim 3, further comprising:
determining the second node transmit slots as a contiguous set of slots within a single frame.

5. The method of claim 3, further comprising:
determining the second node transmit slots as a set of slots that spans a boundary between two frames.

6. The method of claim 3, wherein applying the adjustment comprises:
advancing the second node transmit clock by an amount of time that corresponds to half of the adjustment; and
delaying the second node receive clock by the amount of time that corresponds to half of the adjustment.

7. The method of claim 3, further comprising:
determining first node transmit slots of the data frame and first node receive slots of the data frame, wherein the first node transmit slots and the first node receive slots overlap each other and the first node operates in a full-duplex mode of operation for some propagation delays between the first node and the second node;
receiving, by the first node, the second node transmit burst during the first node receive slots; and
transmitting, by the first node, the first node transmit burst during the first node transmit slots.

8. The method of claim 3, further comprising:
before transmitting the second node transmit burst, the second node performing a receive-to-transmit switching operation during a first guard band interval; and
after transmitting the second node transmit burst, the second node performing a transmit-to-receive switching operation during a second guard band interval.

9. A method performed in a time division duplex (TDD) radio communication system that includes a base and a user equipment (UE), the method comprising the steps of:

determining a propagation delay for radio signals exchanged between the base and the UE;
determining a nominal slot offset, based on the propagation delay, wherein the nominal slot offset represents a number of slots, and the nominal slot offset is determined according to nominal slot offset=[INT(propagation delay/slotTime)](mod NumSlots), where slotTime is a duration of a slot, and NumSlots is a number of slots in the data frame;
determining an adjustment to an alignment between a UE transmit clock and a UE receive clock as a time interval that corresponds to the nominal slot offset, wherein the adjustment, accordingly, is based on the propagation delay between the first node and the second node;
applying, by the UE, the adjustment to the alignment between the UE transmit clock and the UE receive clock, wherein the alignment between the UE transmit clock and the UE receive clock ensures that UE receive slots of the data frame and UE transmit slots of the data frame are non-overlapping with each other in time, and that the UE will operate in a half-duplex mode of operation;
transmitting, by the UE, a UE transmit burst during the UE transmit slots;
receiving, by the base, the UE transmit burst during base receive slots;
transmitting, by the base, a base transmit burst during base transmit slots, wherein the base transmit slots and the base receive slots overlap each other and the base operates in a full-duplex mode of operation for some propagation delays between the base and the UE; and
receiving, by the UE, the base transmit burst during the UE receive slots.

10. The method of claim 9, further comprising:
determining the UE transmit slots as a first contiguous set of slots within a single frame; and determining the base transmit slots as a second contiguous set of slots within a single frame.

11. The method of claim 9, further comprising:
   determining the UE transmit slots as a first set of slots that spans a boundary between two frames; and
   determining the base transmit slots as a second set of slots that spans the boundary between two frames.

12. The method of claim 9, wherein applying the adjustment comprises:
   advancing the UE transmit clock by an amount of time that corresponds to half of the adjustment; and
   delaying the second node receive clock by the amount of time that corresponds to half of the adjustment.

13. The method of claim 9, wherein the step of transmitting the UE transmit burst comprises:
   compressing data to be transmitted in the UE transmit burst by applying a spreading factor to the data prior to transmission in a manner consistent with compressed-mode UMTS (Universal Mobile Telecommunication System) operation.

14. The method of claim 9, wherein the step of transmitting the UE transmit burst comprises:
   the UE transmitting the UE transmit burst to a relay apparatus network that is adapted to relay the UE transmit burst to the base.

15. The method of claim 9, wherein the step of transmitting the base transmit burst comprises:
   the base transmitting the base transmit burst to a relay apparatus network that is adapted to relay the base transmit burst to the UE.

16. A time division duplex (TDD) radio communication system in which information is communicated between a base and a user equipment (UE) in a context of a data frame that includes a plurality of slots, wherein the base is adapted to operate in a full-duplex mode, and wherein each slot corresponds to a time slice within a duration of the data frame, and the system comprises:
   the UE, which is adapted to operate in a half-duplex mode of operation by receiving a base transmit burst during UE receive slots and transmitting a UE transmit burst during UE transmit slots, wherein the UE receive slots include a first subset of a plurality of slots of the data frame, wherein the UE transmit slots include a second subset of the plurality of slots of the data frame, and wherein the UE determines a propagation delay for radio signals exchanged between the base and the UE, determines a nominal slot offset, based on the propagation delay, wherein the nominal slot offset represents a number of slots, and the nominal slot offset is determined according to nominal slot offset=[INT(propagation delay/slotTime)](mod NumSlots), where slotTime is a duration of a slot, and NumSlots is a number of slots in the data frame,
   and wherein the UE further determines an adjustment to an alignment between a UE transmit clock and a UE receive clock as a time interval that corresponds to the nominal slot offset, wherein the adjustment, accordingly, is based on the propagation delay between the first node and the second node, applies the adjustment to the alignment between the UE transmit clock and the UE receive clock, wherein applying the adjustment results in the UE receive slots and the UE transmit slots being non-overlapping with each other for all propagation delays between the UE and the base so that the UE operates in the half-duplex mode of operation for all of the propagation delays.

17. The system of claim 16, further comprising:
   the base, which is adapted to transmit the base transmit burst during base transmit slots and to receive the UE transmit burst during base receive slots, wherein the base transmit slots and the base receive slots overlap each other for at least some of the propagation delays so that the base operates in the full-duplex mode of operation for the at least some of the propagation delays.

18. The system of claim 16, further comprising:
   a relay apparatus network that includes one or more relay apparatus that is adapted to function as a relay for radio signals communicated between the UE and the base, and wherein the relay apparatus network comprises a satellite-borne relay apparatus.

19. The system of claim 16, wherein the UE is a device selected from a group of devices comprising a cellular telephone, a radio, a pager, a personal data assistant, a computer, a network transceiver, an unmanned autonomous vehicle, and a wireless transceiver.

* * * * *